United States Patent [19]
Lee

[11] Patent Number: 5,632,059
[45] Date of Patent: May 27, 1997

[54] WINDSHIELD WIPER FRAME CONNECTOR WHICH ACCOMMODATES DIFFERENT SIZE WIPER ARMS

[75] Inventor: Albert Lee, Timonium, Md.

[73] Assignee: Alberee Products, Inc., Baltimore, Md.

[21] Appl. No.: 421,029

[22] Filed: Apr. 13, 1995

Related U.S. Application Data

[63] Continuation-in-part of Ser. No. 118,663, Sep. 10, 1993, abandoned.

[51] Int. Cl.$^6$ ........................................ B60S 1/40
[52] U.S. Cl. .................. 15/250.32; 15/250.351; 403/24; 403/322; 403/154; 403/161
[58] Field of Search ................ 15/250.32, 250.31, 15/250.351, 250.42, 250.36, 250.33; 403/321, 322, 24, 154, 101

[56] References Cited

U.S. PATENT DOCUMENTS

| | | | |
|---|---|---|---|
| 3,757,377 | 9/1973 | Hayhurst | 15/250.32 |
| 4,370,775 | 2/1983 | van den Berg et al. | 15/250.32 |
| 4,443,907 | 4/1984 | Chamberlain | 15/250.32 |
| 4,670,934 | 6/1987 | Epple et al. | 15/250.32 |
| 4,967,438 | 11/1990 | Arai et al. | 15/250.32 |
| 5,084,933 | 2/1992 | Buechele | 15/250.32 |
| 5,289,608 | 3/1994 | Kim | 15/250.32 |

FOREIGN PATENT DOCUMENTS

| | | | |
|---|---|---|---|
| 2034580 | 6/1980 | United Kingdom | 15/250.32 |
| 2119637 | 11/1983 | United Kingdom | 15/250.32 |
| 2163042 | 2/1986 | United Kingdom | 15/250.32 |
| 2168243 | 6/1986 | United Kingdom | 15/250.32 |

*Primary Examiner*—Gary K. Graham
*Attorney, Agent, or Firm*—Birch, Stewart, Kolasch, Birch, LLP

[57] ABSTRACT

A windshield wiper frame connector for use in a windshield wiper assembly for motor vehicles which accommodates different size wiper arms, wherein the wiper frame connector includes a pair of slots, three pair of raised portions and a pair of stoppers on a pair of sidewalls for forming two pairs of spaces, upper and lower elongated seats, and an angled slot, a hole, and a bayonet lock tongue whereby a hook type wiper arm, or a pin type wiper arm, or a bayonet type wiper arm can be easily connected to a blade unit.

9 Claims, 4 Drawing Sheets

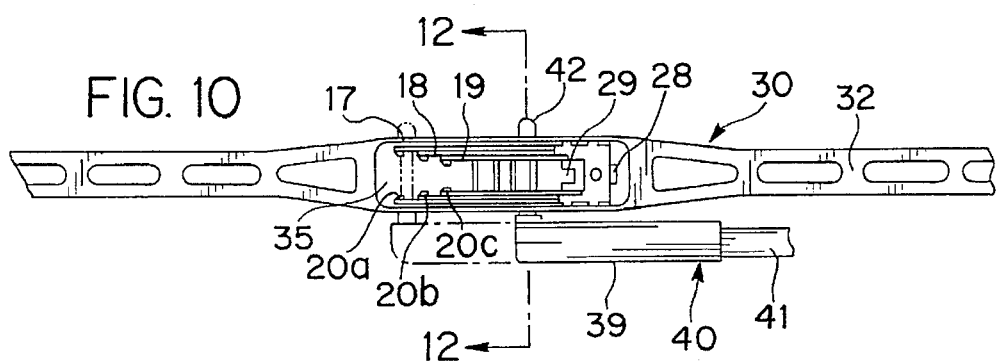
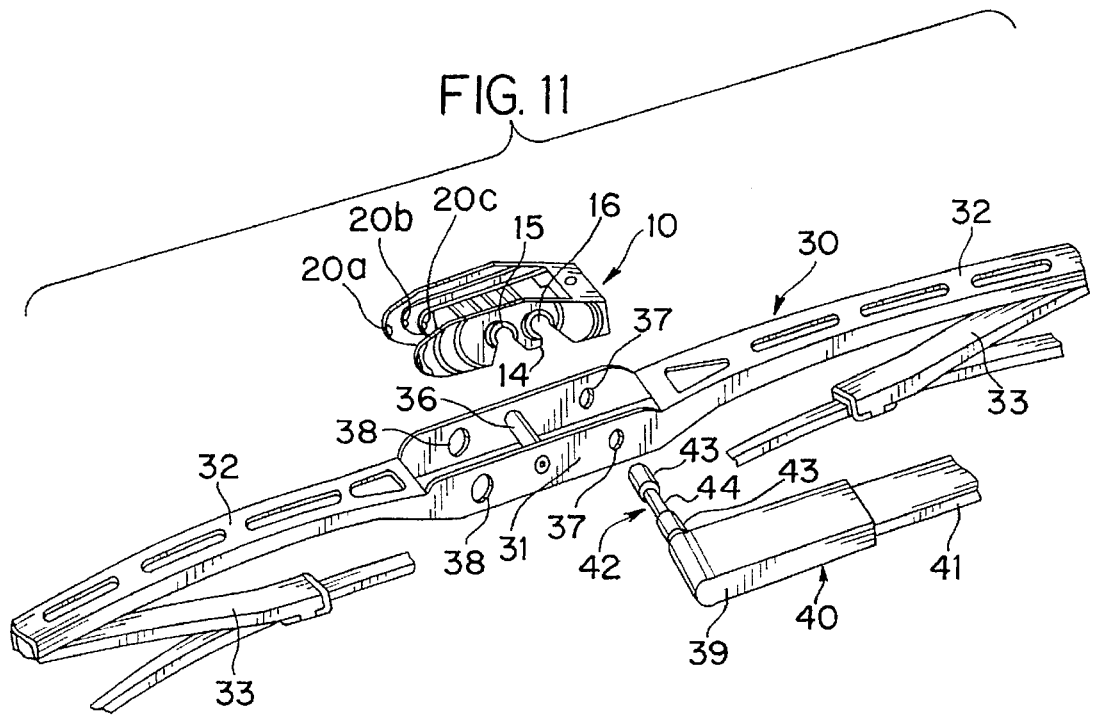
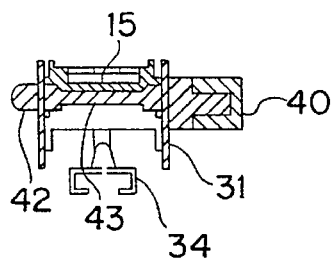
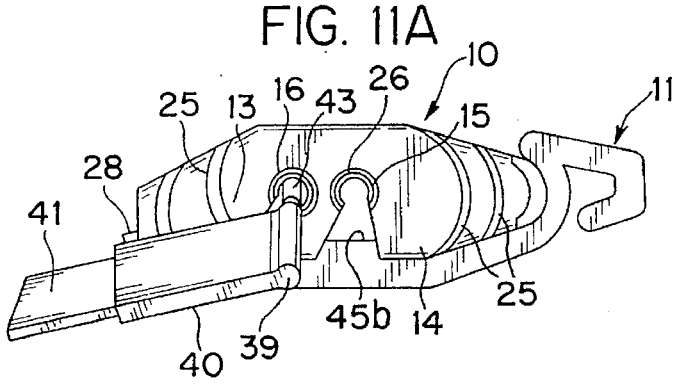

5,632,059

WINDSHIELD WIPER FRAME CONNECTOR WHICH ACCOMMODATES DIFFERENT SIZE WIPER ARMS

This application is a continuation-in-part, of application Ser. No. 08/118,663 filed on Sep. 10, 1993, now abandoned.

BACKGROUND OF THE INVENTION

1. Field of the Invention

The present invention relates generally to the construction of a windshield wiper frame connector and more particularly, to an improved wiper arm and blade unit connector for windshield wipers, comprising first and second slots disposed in the lower portion and a plurality of raised portions disposed on the exterior thereof for more tightly and rotatably mounting to a transverse pin of the blade unit at the first slot and to a rolled bushing of the pin type arm at the second slot thereof, three pairs of aligned locking members and two pair of stoppers disposed on a pair of front wings thereof for slidably receiving the 7 mm, 8 mm, and 9 mm wide hook type arms, and an angled slot and a hole for slidably receiving and locking a bayonet type wiper arm, thereby improving the performance of the windshield wiper assembly.

2. Description of Related Art

Various types of windshield wiper arm and blade unit connectors for a windshield wiper assembly are known. Such windshield wiper frame connectors include a pair of apertured ears pivotally connected to a pin of the pin type arm as shown in U.S. Pat. No. 3,425,089 to Quinlan et al. and U.S. Pat. No. 3,780,395 to Quinlan et al. However, such conventional art wiper frame connectors are costly to manufacture and difficult to assemble with the wiper arm and the blade unit due to their complicated structure. Furthermore, such connectors are incapable of receiving the widely used hook type arm of the windshield wiper assembly which restricts their use in many applicable circumstances.

Conventionally, windshield wiper frame connector 1 as shown in FIG. 1 is equipped with first, second, and third slots 2, 3, and 4 and an L-shaped recess 5 for receiving both the hook type arm and the pin type arm. However, the windshield wiper frame connector 1 suffers from a number of problems. For example, the difference in depth between the first slot 2 of a pin of the blade unit and the second slot 3 of a roller bushing of the pin type arm causes instability when the pin type arm is connected to the wiper frame connector 1. Moreover, receiving the hook type arm lacks any locking members that would securely lock the hook type arm to the wiper frame connector. The body 6 of the wiper frame connector 1 uses much material and is heavy in weight. These characteristics and above stated problems are disadvantages in achieving an efficient and economical windshield wiper assembly.

The present applicant is also prosecuting another U.S. patent application Ser. No. 07/888,154, filed May 26, 1992, now allowed as U.S. Pat. No. 5,289,608, which discloses a windshield wiper frame connector for use in a windshield wiper assembly for motor vehicles which includes a pair of slots, two pair of raised portions and a pair of stoppers on a pair of sidewalls for forming two pairs of spaces, upper and lower elongated seats, and an angled slot and a hole, whereby a hook type wiper arm, or a pin type wiper arm, or a bayonet type wiper arm can be easily connected to a blade. However, this wiper frame connector cannot accommodate different size wiper arms such as 7 mm, 8 mm, and 9 mm of a wide hook portion.

SUMMARY OF THE INVENTION

Accordingly, it is an object of the present invention to provide an improved windshield wiper frame connector for use in a windshield wiper assembly for motor vehicles.

Another object of the present invention is to provide an improved connector separately connected to a wiper arm such as a pin type wiper arm, a hook type wiper arm, and a bayonet type wiper arm and a blade unit having two pairs of different size apertures for a windshield wiper assembly.

A further object of the present invention is to provide a windshield wiper frame connector having a pair of slots disposed in the lower portion thereof, the first slot rotatably mounting to a transverse pin of the blade unit and the other slot rotatably receiving a roller bushing of the pin type wiper arm, and three pairs of aligned locking members and three pair of stoppers disposed on opposite inner surfaces of the front wings thereof such that a hook portion of the hook type arm tightly engages either with one space disposed on one locking member and two pair of spaces formed between the three pairs of locking members of the wiper connector, or with two spaces formed between the pair of stoppers and two crossmembers formed between the front wings, thereby improving the wiping performance of the windshield wiper assembly and extending its operational life. The three pairs of aligned locking members and three pairs of stoppers can thereby accommodate three different width hook arms. The windshield wiper frame connector also accommodates a bayonet type wiper arm, via an angled slot into which the bayonet type wiper arm can slide and a hold and a locking tongue which engages a locking pin on the bayonet type wiper arm.

Still another object of the present invention is to provide an improved wiper frame connector for use in two pairs of different size apertures.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is a top plan view of the windshield wiper frame connector of the present invention for a pin type wiper arm;

FIG. 11 is an exploded, perspective view of the windshield wiper frame connector of the present invention in combination with the blade unit having two pairs of different size apertures and the pin type wiper arm;

FIG. 11A is a side view of the windshield wiper frame connector in combination with a pin type wiper arm; and FIG. 12 is a cross-sectional view, taken along line 12—12 in FIG. 10.

DETAILED DESCRIPTION OF PREFERRED EMBODIMENTS

Figure 1:
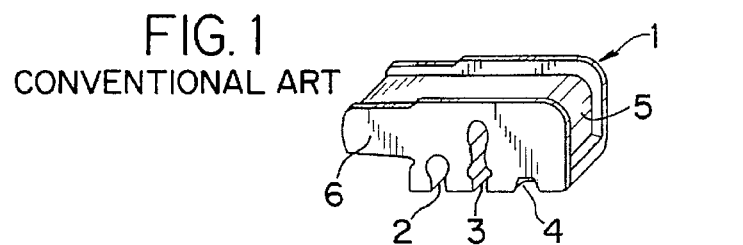
FIG. 1 is a perspective view of a conventional windshield wiper frame connector.
Figure 2:
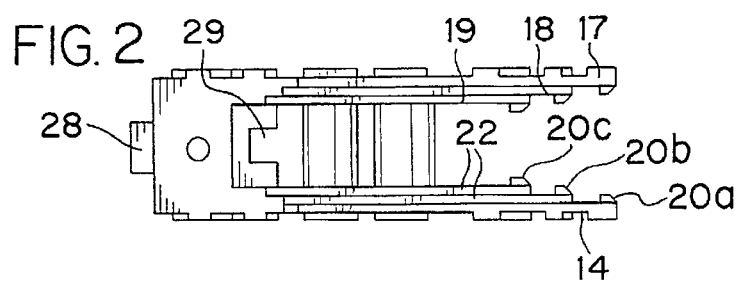
FIG. 2 is a bottom plan view of a windshield wiper frame connector of the present invention.
Figure 3:
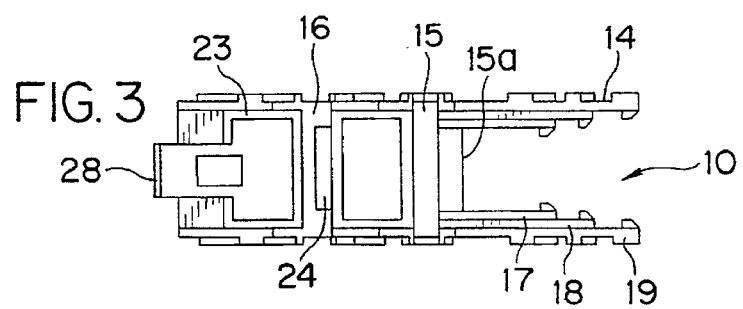
FIG. 3 is a top plan view of the windshield wiper frame connector of the present invention.
Figure 4:
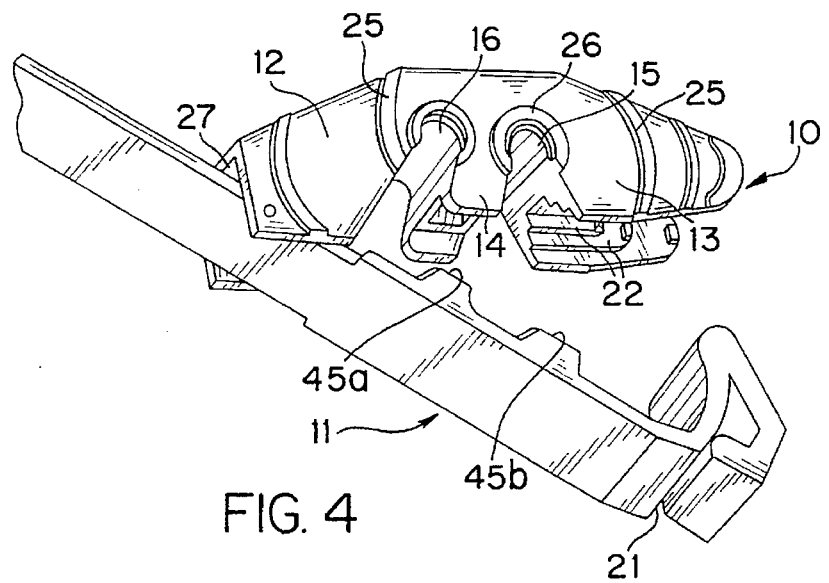
FIG. 4 is a perspective view of the windshield wiper frame connector of the present invention in combination with a hook type wiper arm.

Referring now in detail to the drawings for the purpose of illustrating preferred embodiments of the present invention, the windshield wiper frame connector 10 being connected to a hook type wiper arm 11 such as a safety lock highest speed device and a blade unit (not shown) for use in a windshield wiper assembly of motor vehicles as shown in FIGS. 2, 3, and 4, comprises a body member 12, a pair of sidewalls 14 each having a front wing portion 13, and a first slot 15 and a second slot 16 disposed in the lower portion of the body member 12. A pair of first raised portions 17, a pair of second raised portions 18, and a pair of third raised portions 19 each with a stopper 20a, a stopper 20b, and a stopper 20c, respectively, are disposed on the inside surface of a pair of front wings 13 of the body member 12, for forming first and second pairs of spaces between the first and second raised portions 17 and 18 and the second and third raised portions 18 and 19, so as to slidably receive a hook portion 21 of the hook type wiper arm 11 of 9 mm, 8 mm, and 7 mm of conventional wide hook type arms. The third raised portions 19 are more specifically the upper edge of sidewalls 14 as seen from the FIGS. A first pair of spaces is formed between stoppers 20a and 20b. A second pair of spaces is formed between stoppers 20b and 20c. A third pair of spaces is formed between stoppers 20c and a cross-member 15a which connects sidewalls 14. These second and third pairs of spaces also slidably receive the hook portion 21 of the hook type wiper arm of 8 mm and 7 mm wide hook type arms.

Figure 6A:
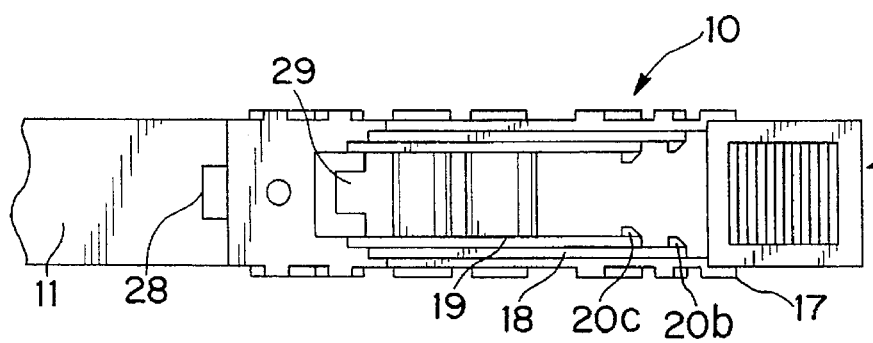
FIG. 6A is a bottom plan view of the windshield wiper frame connector of the present invention in combination with a 9 mm hook type wiper arm.
Figure 7:
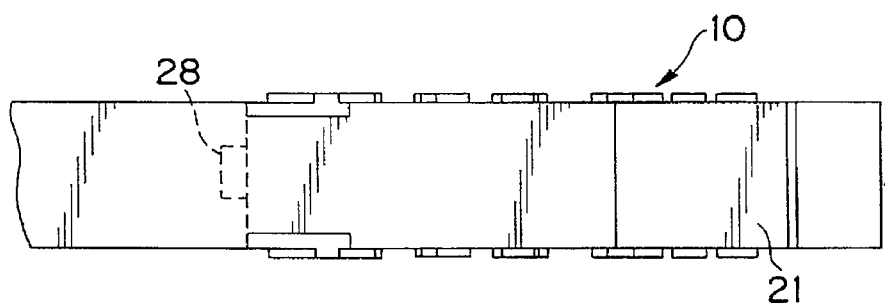
FIG. 7 is a top plan view of the windshield wiper frame connector of the present invention in combination with the hook type wiper arm.
Figure 8:
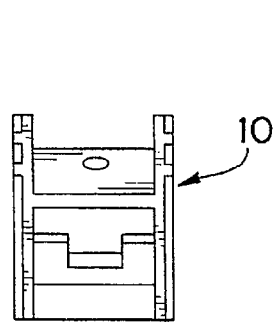
FIG. 8 is a left elevational view of the wiper frame connector of the present invention.
Figure 9:
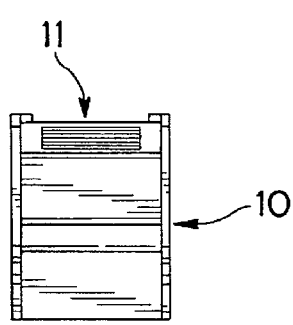
FIG. 9 is a right elevational view of the wiper frame connector of the present invention.
Figure 6B:
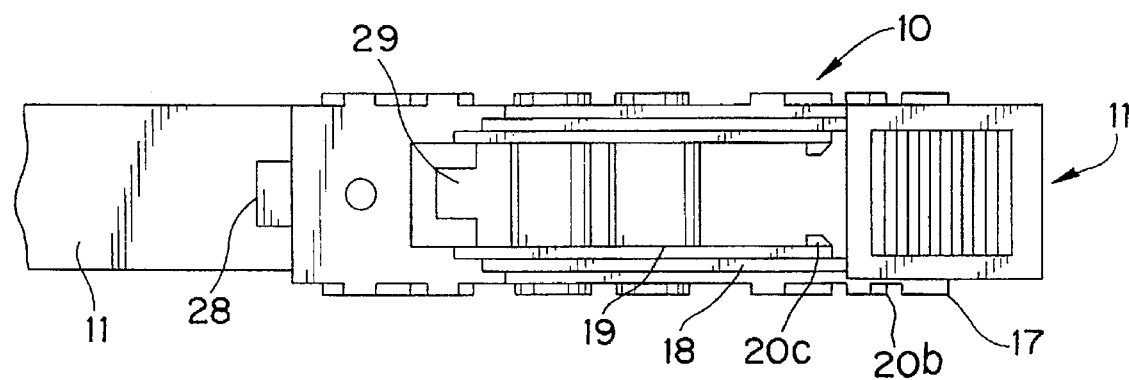
FIG. 6B is a bottom plan view of the windshield wiper frame connector of the present invention in combination with an 8 mm hook type wiper arm.
Figure 6C:
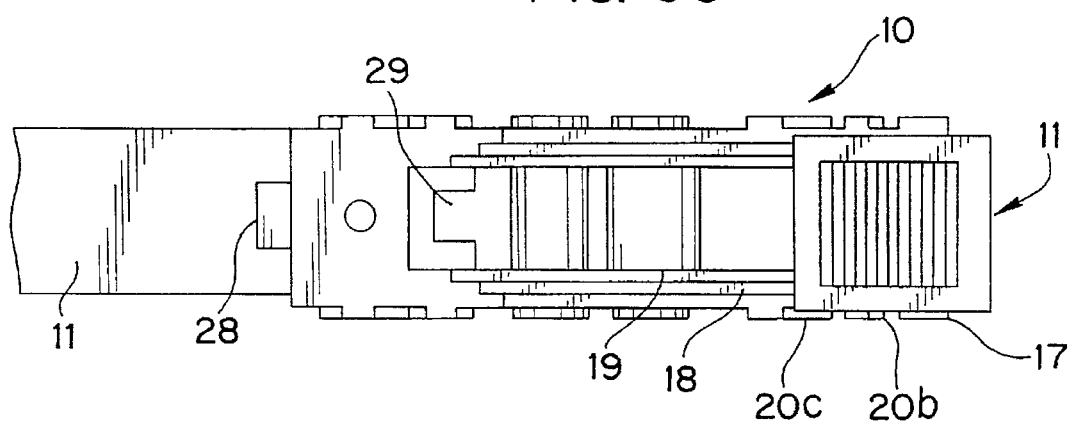
FIG. 6C is a bottom plan view of the windshield wiper frame connector of the present invention in combination with a 7 mm hook type wiper arm.

However, the first pair of spaces accommodates a wide hook type wiper arm 11 of 9 mm wide hook type arm, whereas the second pair of spaces accommodates a narrower hook type wiper arm 11 of 8 mm wide hook type arm, and the third pair of spaces accommodates a hook type wiper arm of 7 mm wide. The first raised portion 17 is provided with a first pair of spaces which is disposed on the first raised portion 17 for slidably receiving the hook portion 21 of the hook type wiper arm of 9 mm of a wider hook type wiper arm. In this manner, the connector 10 of the present invention can accommodate three different width hook type wiper arms of 7 mm, 8 mm, and 9 mm by slidably receiving and locking the hook portion 21 within either one of two pairs of spaces provided thereon as shown respectively in FIGS. 6A, 6B, and 6C, whereas the conventional connector can accommodate or clasp only one width of hook type wiper arm. For example, the connector of the present invention can be used with a 9 mm wide hook portion, 8 mm wide hook portion and a 7 mm wide hook portion, while the conventional connector would require three separate connectors, produced from three separate injection molds, each one of the three to be used with only one size hook portion.

As shown in FIGS. 2, 3, and 4, two pairs of upper elongated horizontal seats 22 extend from the inside surface of the upper portions of the body member 12 and a pair of lower horizontal seats 23 extend from the inside surface of the lower portions of the body member 12 for tightly engaging with the clasping member arm 11. The lower horizontal seats 23 are interrupted by slots 15 and 16, whereas upper elongated horizontal seats 22 are uninterrupted. An arc-shaped raised surface 24 is located in the second slot 16.

Figure 5:
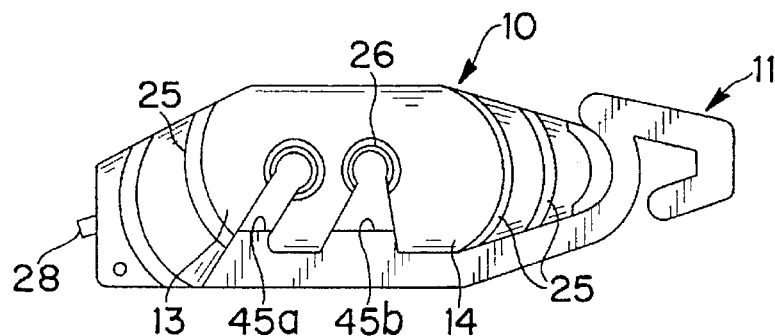
FIG. 5 is a perspective view of the windshield wiper frame connector of the present invention assembled with the hook type wiper arm.

As shown in FIGS. 4 and 5, the wiper frame connector 10 of the present invention further includes a plurality of arc-shaped raised lines 25 disposed on the side walls 14 and a pair of C-shaped circumferential raised portions 26 disposed on the outer surfaces of the first slot 15 for tightly inserting into an opening 35 of a wiper blade unit 30. Accordingly, when the hook type wiper arm 11 is connected to the wiper connector 10, the hook portion 21 of the hook type wiper arm 11 covers both first and second slots 15, 16 and effectively tightly connects a pair of the hook type projections 45a and 45b of wiper arm 11 to the wiper blade unit 30 (FIG. 4). In other words, when the hook type wiper arm 11 is used in a hook type wiper blade, the arm 11 is extended to connect to the window mountings of an automobile. However, in a pin type wiper arm, the same connection of the hook end 21 of a shortened hook type wiper arm is utilized as shown generally in FIG. 5.

As shown in FIGS. 10, 11, and 12, the wiper blade unit 30 includes a bridge member 31, a pair of primary yokes 32 connected to the bridge member 31 and a pair of secondary yokes 33 each pivotally connected to one end of the respective primary yoke 32 (FIG. 11). Ends of the pair of secondary yokes 33 and the other end of the pair of primary yokes 32 are provided with a claw 34 (FIG. 12). The bridge member 31 includes the opening 35, a transverse pin 36, and a pair of first pin apertures 37 and a pair of second pin apertures 38. The first and second pin apertures have a diameter of approximately 4.8 mm and 6.4 mm for slidably receiving 3/16 inch and 1/4 inch diameter pin type arms 40.

Also, referring in detail to FIGS. 10, 11, and 12, there is illustrated the windshield wiper frame connector 10 of the present invention for the pin type wiper arm 40. The pin type wiper arm 40 includes a pin holder 39 with an arm body 41, pin 42 having a pair of rolled bushings 43 and a reduced portion 44 for rotatably contacting the arc-shaped raised surface 24 of the second slot 16 of the wiper connector 10. At this time, the reduced portion 44 of the pin 42 of the pin type wiper arm 40 can be tightly locked with the arc-shaped raised surface 26 of the second slot 16 by a shortened hook type wiper arm 11 as shown in FIG. 11A. Also the pair of rolled bushings 43 are rotatably inserted into the pair of first pin apertures 37 the pair of or second pin apertures 38.

There is illustrated the windshield wiper frame connector 10 of the present invention, with a bayonet type wiper arm (not shown) installed therein. The bayonet type wiper arm includes a free end which is slidably received in an angled slot 27 in connector 10, and a locking pin which is received into a hole 29 disposed on the rear portion of the body member 15 and is tightly received by a bayonet lock tongue 78 disposed on the extreme rear portion of the body member 12. The blade unit is then connected to 10 via a transverse pin, in the same manner as for the hook type wiper arm and the pin type wiper arm discussed above.

Accordingly, the wiper frame connector 10 of the present invention can be easily used as an adapter for the blade unit to connect to the hook type wiper arm 11, or the pin type wiper arm, or the bayonet type wiper arm if necessary. Furthermore, the wiper arms are tightly and securely connected to the blade unit so that the wiper connector 10 of the present invention achieves an effective connecting operation and improves the wiping performance of the windshield wiper assembly as well as its operational lifetime.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A windshield wiper frame connector for connecting a wiper blade unit to a wiper arm, said connector comprising:

a body member having a first end and a second end, and a pair of laterally spaced sidewalls, each of said sidewalls having a front wing portion at the second end of said body member as an extension of said sidewalls, said front wing portion defining opposing inner surfaces;

a first slot disposed in a lower portion of said body member for rotatably receiving a transverse pin of a wiper blade unit;

a second slot disposed in said lower portion of said body member adjacent to said first slot for rotatably receiving a pin of a pin type wiper arm;

an arc-shaped surface located within said second slot, said arc-shaped surface being provided to engage with a reduced diameter portion of the pin of said pin type wiper arm;

a clasping arm pivotally connected at a first end thereof to the first end of said body member and having a hook portion formed at a second end of said clasping arm corresponding to the second end of said body member, said hook portion being one of a first width, a second width, and a third width, said clasping arm selectively closing openings of each said first and second slots upon pivotal movement thereof;

a pair of opposing first sidewall portions disposed on said opposing inner surfaces of said front wing portions and coextensive with said sidewalls;

a pair of opposing second sidewall portions disposed on said opposing inner surfaces of said front wing portions of the sidewalls, said pair of second sidewall portions partially overlaying said pair of first sidewall portions;

a pair of opposing third sidewall portions, said pair of third sidewall portions partially overlaying said pair of second sidewall portions, said pairs of opposing first, second and third sidewall portions defining first, second and third spaces disposed therebetween, respectively, for alternatively receiving the hook portion of said clasping arm;

a pair of first, second and third stoppers disposed on said pair of first, second and third sidewall portions, wherein said first and second and said second and third pairs of stoppers may alternatively receive and frictionally lock with outer surfaces of the hook portion of the clasping arm of the first or second widths, respectively;

a cross-member formed between said pair of sidewalls and extending substantially perpendicular to said sidewalls, said third stoppers and said cross-member defining said third space for alternatively receiving and locking an outer surface of the hook portion of said clasping arm of the third width;

a pair of upper seats and a pair of lower seats disposed on an inner surface of said sidewalls, said upper and lower seats being provided for engaging a hook portion of a hook type wiper arm; and a plurality of arc-shaped raised lines disposed on an outer surface of the sidewalls and a pair of C-shaped circumferential raised portions disposed on outer surfaces of said first slot whereby the wiper frame connector is tightly inserted into an opening of the blade unit.

2. The windshield wiper frame connector of claim 1, wherein said pair of upper seats are horizontally elongated without interruption and said pair of lower seats are interrupted by said first and second slots.

3. The windshield wiper frame connector of claim 1, further comprising an angled slot, a hole and a bayonet lock tongue which are in mutual communication, said angled slot, said hole and said bayonet lock tongue being disposed in a rear portion of said body member for slidably receiving a bayonet type wiper arm provided with a locking pin for engagement with said hole.

4. The windshield wiper frame connector of claim 1, wherein said first, second and third widths are 9 mm, 8 mm and 7 mm, respectively.

5. A windshield wiper frame connector for connecting a wiper blade unit to a wiper arm, said connector comprising:

a body member having a first end and a second end, and a pair of laterally spaced sidewalls, each of said sidewalls having a front wing portion at the second end of said body member as an extension of said sidewalls, said front wing portion defining opposing inner surfaces;

a first slot disposed in a lower portion of said body member for rotatably receiving a transverse pin of said wiper blade unit;

a second slot disposed in said lower portion of said body member adjacent to said first slot for rotatably receiving a pin of a pin type wiper arm;

an arc-shaped surface located within said second slot, said arc-shaped surface being provided to engage with a reduced diameter portion of the pin of said pin type wiper arm;

a clasping arm pivotally connected at a first end thereof to the first end of said body member and having a hook portion formed at a second end of said clasping arm corresponding to the second end of said body member, said clasping arm selectively closing openings of each said first and second slots upon pivotal movement thereof; and means for selectively engaging the hook portion of said clasping arm between the front wing portions of each of said sidewalls, thereby securely clamping both the transverse pin of said wiper blade unit and the pin of said pin type wiper arm.

6. The connector according to claim 5, wherein said hook portion is one of a first width, a second width, and a third width, said body member further comprising:

a pair of opposing first sidewall portions disposed on said opposing inner surfaces of said front wing portions and coextensive with said sidewalls;

a pair of opposing second sidewall portions disposed on said opposing inner surfaces of said front wing portions of the sidewalls, said pair of second sidewall portions partially overlaying said pair of first sidewall portions;

a pair of opposing third sidewall portions, said pair of third sidewall portions partially overlaying said pair of second sidewall portions, said pairs of opposing first, second and third sidewall portions defining first, second and third spaces disposed therebetween, respectively, for alternatively receiving the hook portion of said clasping arm;

a pair of first, second and third stoppers disposed on said pair of first, second and third sidewall portions, wherein said first and second and said second and third pairs of stoppers may alternatively receive and frictionally lock with outer surfaces of the hook portion of said clasping arm of the first or second widths, respectively;

a cross-member formed between said pair of sidewalls and extending substantially perpendicular to said sidewalls, said third stoppers and said cross-member defining said third space for alternatively receiving and locking an outer surface of the hook portion of said clasping arm of the third width;

a pair of upper seats and a pair of lower seats disposed on an inner surface of said sidewalls, said upper and lower seats being provided for engaging a hook portion of a hook type wiper arm; and a plurality of arc-shaped raised lines disposed on an outer surface of the sidewalls and a pair of C-shaped circumferential raised portions disposed on outer surfaces of said first slot whereby the wiper frame connector is tightly inserted into an opening of the blade unit.

7. The connector according to claim 6, wherein said pair of upper seats are horizontally elongated without interruption and said pair of lower seats are interrupted by said first and second slots.

8. The connector according to claim 6, wherein said first, second and third widths are 9 mm, 8 mm and 7 mm, respectively.

9. The connector according to claim 5, further comprising an angled slot, a hole and a bayonet lock tongue which are in mutual communication, said angled slot, said hole and said bayonet lock tongue being disposed in the first end of said body member for slidably receiving a bayonet type wiper arm provided with a locking pin for engagement with said hole.

* * * * *